United States Patent [19]

Sharpless

[11] 3,793,629

[45] Feb. 19, 1974

[54] ELECTRICAL DISPLAY DEVICES

[75] Inventor: Graham Trevor Sharpless, Peveril, England

[73] Assignee: U.S. Philips Corporation, New York, N.Y.

[22] Filed: Jan. 5, 1973

[21] Appl. No.: 321,332

Related U.S. Application Data

[63] Continuation of Ser. No. 81,008, Oct. 15, 1970, abandoned.

[52] U.S. Cl...... 340/324 M, 178/7.3 D, 315/169 TV

[51] Int. Cl. .............................................. G06f 3/14

[58] Field of Search ............ 340/324 M; 178/7.3 D; 315/169 TV

[56] References Cited

UNITED STATES PATENTS 3,526,711 9/1970 Boer ................................ 178/7.3 D 3,611,296 10/1971 Johnson ........................ 340/166 EL 3,614,769 10/1971 Coleman et al. ............... 340/324 M 3,673,461 6/1972 Eisenberg ..................... 315/169 TV

*Primary Examiner*—David L. Trafton

*Attorney, Agent, or Firm*—Frank R. Trifari

[57] ABSTRACT

An electrical display device comprising an array of light emitting elements in rows and columns. A plurality of shift registers wherein each register has bit positions for energizing only a fraction of the number of columns and is employed for selectively energizing these elements in accordance with binary code. These registers are stepped in parallel by clock pulses to fill each register serially with column energizing signals. This enables the clock rate of the arrangement to operate at only a fraction of the clock rate which would be necessary if a signal column register that is filled serially was used.

8 Claims, 6 Drawing Figures

*INVENTOR.*

GRAHAM T. SHARPLESS

*BY*

AGENT

INVENTOR.
GRAHAM T. SHARPLESS
BY
AGENT

INVENTOR.
GRAHAM T. SHARPLESS

BY [signature]

AGENT

INVENTOR.
GRAHAM T. SHARPLESS
BY
[signature]
AGENT

INVENTOR.
GRAHAM T. SHARPLESS
BY
AGENT

ELECTRICAL DISPLAY DEVICES

This is a continuation of application, Ser. No. 81,008, filed Oct. 15, 1970 now abandoned.

This Invention relates to addressing circuit arrangements for electrical display devices of the kind comprising a two-dimensional matrix of light-emitting elements, for example glow discharge cells or light-emitting diodes, which are connected at respective cross-points formed by two groups of co-ordinate conductors and each of which can be illuminated selectively by suitable energizing signals applied contemporaneously to the two conductors, one in each group, between which the element is connected.

CROSS REFERENCE TO RELATED APPLICATIONS

Electrical display devices of the above kind comprising glow discharge cells are described in U.S. Pat. No. 3,553,458, U.S. Pat. application, Ser. No. 699,269, filed Jan. 19, 1968, now abandoned, and U.S. Patent application Ser. No. 766,525 filed Oct. 17, 1968, now abandoned and in co-pending patent applications Ser. No. 31,864, filed May 1, 1970 and Ser. No. 108,965, filed Oct. 22, 1971. The electrical display device described in the above-identified patent application comprises a small 5 × 7 cell matrix of glow discharge cells and is suitable for displaying one alpha-numeric character. A plurality of similar small cell matrices can be used to form a composite panel of larger size suitable for displaying a relatively large number of alpha-numeric characters simultaneously. A typical larger size panel may comprise a 200 (row) × 200 (column) two-dimensional matrix of glow discharge cells. Assuming that each character region of this larger size panel comprises 6 × 8 = 48 cells, of which 5 × 7 = 35 are active cells for character formation and the remaining cells provide guard bands for spacing apart adjacent characters and adjacent lines of characters, then 25 lines of 33 alpha-numeric characters (825 characters in all) can be displayed on the panel simultaneously.

The words "row" and "column" are used, and will be so used hereinafter, solely to distinguish between the co-ordinate lines of light-emitting elements which form the two-dimension matrix of an electrical display device of the kind referred to. Thus, either of the two groups of co-ordinate lines of elements can be termed "row" elements with the elements of the other group being termed "column" elements. The two groups of co-ordinate conductors which form the cross-points will be referred to, correspondingly, as "row" conductors and "column" conductors.

An addressing circuit arrangement for an electrical display device of the kind referred to is required to address the device with energising signals appropriate for illuminating selectively the light-emitting elements of the device to provide a visual display of alpha-numeric characters. The selective energization of the light-emitting elements to produce the visual display can be effected by addressing each row of elements in turn with energizing signals applied to the row conductors in a recurrent scanning cycle and by arranging that during the period that each row is being addressed, the columns of elements are addressed selectively with energizing signals applied to selected column conductors which pertain to those elements in the row that are to form discrete parts of the characters to be displayed, this addressing of the columns being determined by coded electrical signals that represent the characters to be displayed. Thus, these elements, and only these elements are addressed with coincident energizing signals and are therefore illuminated. Assuming that a plurality of lines of characters, with each line containing a plurality of characters, are to be displayed, and assuming that each line of characters extends over several rows (e.g. 7) of light-emitting elements, then it will be appreciated that as the rows are addressed in turn in the scanning cycle, the characters in each line are built-up row-by-row as a whole, and the lines of characters are built-up in succession. Thus, with a sufficiently fast scanning rate, the effect will be the visual display of the plurality of lines of characters simultaneously.

For a satisfactory display using this recurrent scanning cycle mode of operation (which will be referred to hereinafter as the "line-dumping mode"), a field rate of 50 HZ is desirable in order to prevent flicker, that is, the matrix is scanned row-by-row 50 times per second. Thus, for a 200 × 200 element matrix a row rate of 50 × 200 = 10KHz(8.75 KHz) is necessary. This means that the row dwell time is 100 $\mu$S (114 $\mu$S) during which each element which is to be energized in a row should be held energized for as long a time as possible during the 100 $\mu$S in order to achieve maximum brightness. However, in the case of a glow discharge cell, at least 10 $\mu$S of the row dwell time is taken up by an inherent delay which occurs before the discharge of an energized cell will ignite and of the remaining 90 $\mu$S during which the cell could be held energized, some of this 90 $\mu$S is required for filling a column register in dependence on the coded electrical signals for the selective addressing of the cell columns. In order to keep the column addressing time at a maximum, the column register fill time may be, say, 10 $\mu$S (11.4 $\mu$S) so that the actual column addressing time is 90 $\mu$S; which means that the "on time" of the cells is 80 $\mu$S due to their inherent delay. This means that if the column register is filled serially, with coded electrical signals for column addressing, in the 10 $\mu$S which is allocated for this purpose a stepping or clock rate of $10^5$ × 200 = 20 MHz is necessary. In practice, this clock rate can be reduced slightly because there may be only 160 active cell columns and 175 active cell rows for character formation, the remaining row and colum cells forming the guard bands, as aforesaid. The alternative values given in brackets in the preceding part of this paragraph relate to the lesser number of active row and column cells.

A reduction in the clock rate can be obtained by using two column registers alternately, so that each whole row dwell time is available for filling one column register in respect of the selective addressing of the cell columns during the next row dwell time, while the other column register is effecting the selective addressing of the cell columns during the current row dwell time, having been filled during the receding row dwell time. This use of two column registers at a slower clock rate permits their realization and the realisation of the addressing circuit arrangement using cheaper logic circuits (DTL's) say, instead of more expensive logic circuits (TTL's) say, which would be needed in the case of a single column register operating at the higher clock rate. However, the use of two column registers in this way means that the number of register bit positions required is twice the actual number used for column addressing.

BRIEF SUMMARY OF THE INVENTION

It is an object of the present invention to provide for an electrical display device of the kind referred to, an addressing circuit arrangement which uses the "line-dumping mode" of operation; and in which column addressing is effected by column register means which require only the same number of register bit positions as a single column register but which enable a significantly slower clock rate to be used, for a given column addressing time, than would be required for filling serially a single column register.

According to the invention, an addressing circuit arrangement for an electrical display device of the kind referred to comprises column register means adapted to receive groups of coded electrical signals, the signals in successive groups pertaining to respective different pluralities of $n$ columns to be addressed and the signals in each group being applied to the column register means in parallel, the column register means being adapted to be stopped by clock pulses of the addressing circuit arrangement in such manner that the signals in each group are transferred along the column register means in parallel to column addressing positions for the columns to which they pertain. In this way the column register means can be filled using a clock rate of only $1/n$ the clock rate that would be required for filling the column register means serially with coded electrical signals.

In carrying out the invention, the column register means is preferably in the form of a plurality of discrete registers each having bit positions for addressing only $1/n$ times the number of columns, ($n$ being thus also the number of discrete registers), each discrete register being arranged to receive only the coded electrical signals pertaining to the columns, different for each register, which it addresses and the discrete registers being adapted to be stepped in parallel by the clock pulses of the addressing circuit arrangement to fill each of them serially with the coded electrical signals.

Conveniently, the discrete registers can be so arranged that there is one register for each possible column required for a character region (e.g., 5 in a 7 × 5 character region), so that coded electrical signals for one row of a character region form a group as aforesaid, and are all entered into the discrete registers, one signal in each, by one clock pulse.

In order that the invention may be more fully understood reference will now be made by way of example to the accompanying drawings of which:

DETAILED DESCRIPTION

Figure 1:
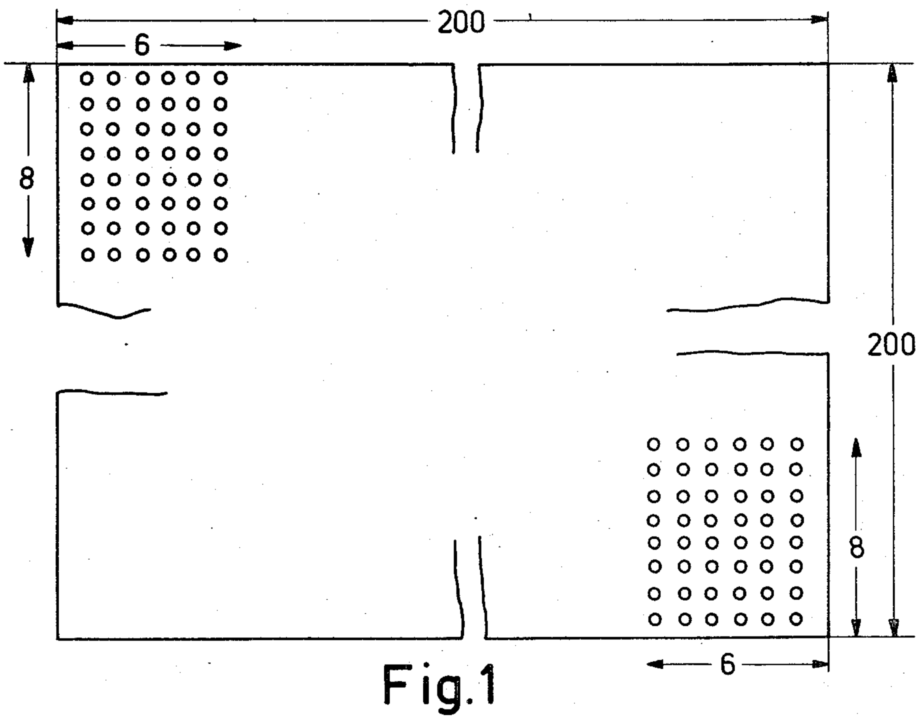
FIG. 1 is a fragmentary diagrammatic front view of an electrical display device.

Referring to the drawings, the electrical display device shown in FIG. 1 is representative of a 200 × 200 two-dimensional matrix of light-emitting elements such as glow discharge cells. Assuming that each character region of this matrix comprises 6 × 8 = 48 cells of which 5 × 7 = 35 are active cells for character formation and the remaining cells provide guard bands for spacing apart adjacent characters and adjacent lines of characters, then this matrix can provide 25 lines of 32 alpha-numeric characters (800 characters in all).

Figure 2:
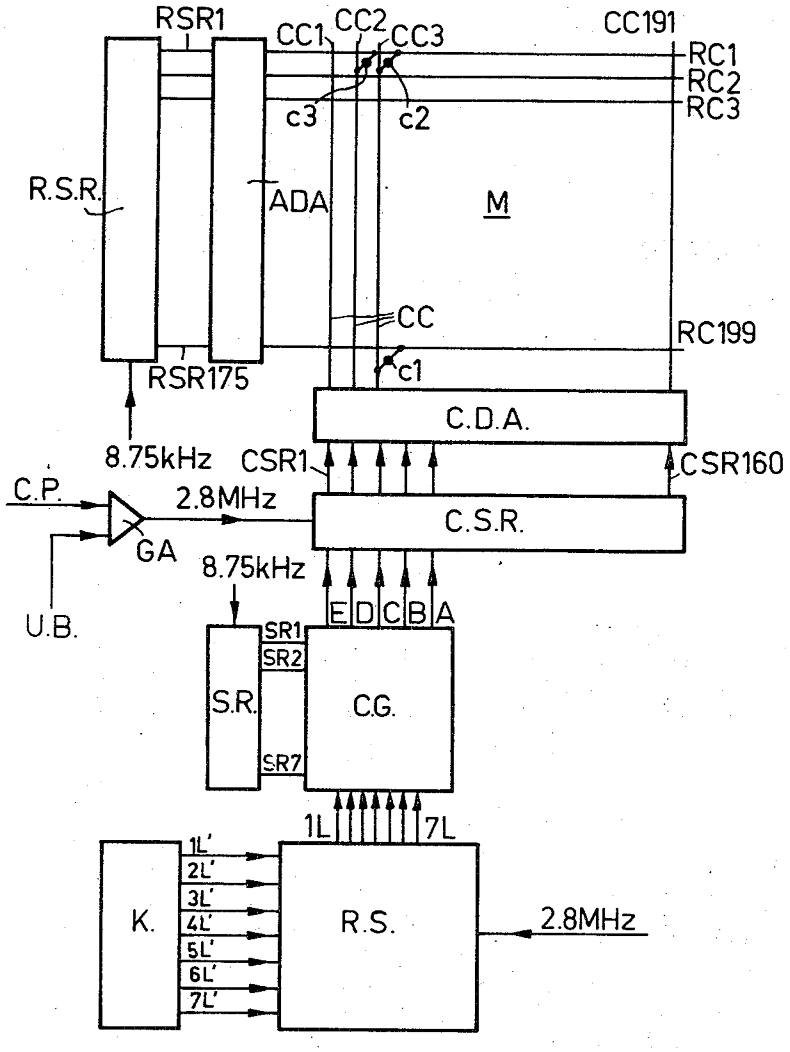
FIG. 2 is a block schematic diagram of an addressing circuit arrangement for the electrical display device of FIG. 1.

In FIG. 2, the 200 × 200 matrix of glow discharge cells is represented at M. Each of the cells (40,000 in all) has an anode and a cathode by which it is connected between one row conductor R and one column conductor C. Two hundred row conductors R are provided as one co-ordinate array for the matrix and two hundred column conductors C are provided as the other co-ordinate array of the matrix. Any one of the cells of the matrix can be illuminated by energizing (i.e. addressing) contemporaneously the particular row conductor and the particular column conductor between which it is connected. For example, of the three cells $c1$, $c2$ and $c3$ exemplifying the matrix M, the cell $c1$ will be illuminated by energizing signals applied to row conductor 199 and column conductor 3. It is mentioned that because of the cells in each character region which forms guard bands, as aforesaid, certain row and column conductors would not need to be addressed. Thus, as shown in FIG. 2, there are only 175 effective row conductors of which conductor 199 is the last, and only 160 effective column conductors of which conductor 191 is the last. This number of effective row and column conductors also takes into account the fact that in the present instance it is assumed that the display provides 32 characters per line, not 33 which is the maximum number possible.

Energizing signals for addressing the row conductors R are supplied in turn in a recurrent scanning cycle by a row shift register RSR which is stepped cyclically by 8.75 KHz ROW PULSES applied to its input. The energizing signals are applied to the row conductors R through anode drive amplifiers ADA. The cycling rate at each row conductor R is thus 50 Hz which is sufficient to avoid brightness flicker of the cells, and the row dwell time is 114 μS.

Energizing signals for addressing the column conductors C are supplied by a column shift register CSR through cathode drive amplifiers CDA. It is the function of the column shift register CSR to address particular column conductors C in dependence on the particular characters that are to be formed for display. To fulfil this function the column shift register CSR is filled with data pertaining to each row of cells in turn, and this data is then fed out from the column shift register CSR in parallel as the addressing signals for those column conductors that pertain to the particular cells of the row that are to be energized. These cells then become energized when their row is addressed by the row shift register RSR.

The column shift register CSR is filled by data applied to it from a character generator CG which is fed from a recirculating store RS with coded electrical signals pertaining to the characters to be displayed. The coded electrical signals constitute input data received from a keyboard K (or tape reader or computer), this input data being in the form of a 7 - bit word per character. This input data per character is received in parallel by the store RS and is read out therefrom in parallel to the character generator CG. The recirculating store RS is driven by 2.8 MHz CLOCK PULSES which are also used to step the column shift register CSR. The data output from the character generator CG to the column shift register CSR is controlled by a row scan register SR which is stepped in synchronism with the row shift register RSR by the 8.75 KHz ROW PULSES. The row scan register SR causes successive groups of coded electrical signals, for energizing one row of cells pertaining to successive characters in turn of a line of characters, to be read out to the column shift register CSR as the character generator receives input data for each of these characters in turn from the recirculating store RS. The coded electrical signals in each group are applied to the column shift register CSR in parallel and are stepped along the latter in parallel to the relevant column positions under the control of the 2.8 MHz CLOCk PULSES. The filling of the column shift register CSR for one row of 32 characters takes 12 $\mu$S; the CLOCK PULSES being applied to the column shift register CSR for this period in each 114 $\mu$S row dwell time through a gating amplifier GA which is unblanked 12 $\mu$S every 114 $\mu$S. The column addressing signals from the relevant column positions of the column shift register CSR are applied to the cathode drive amplifiers CDA which are unblanked for 100 $\mu$S in each row dwell time, when the CLOCK PULSES are blanked, to cause energizing signals to be applied to the relevant column conductors C. This is repeated 7 times per line of characters to build-up the characters row-by-row and, thereafter lines of characters line-by-line at a 50 Hz refresh rate to give a visual display of the characters selected.

Figure 3:
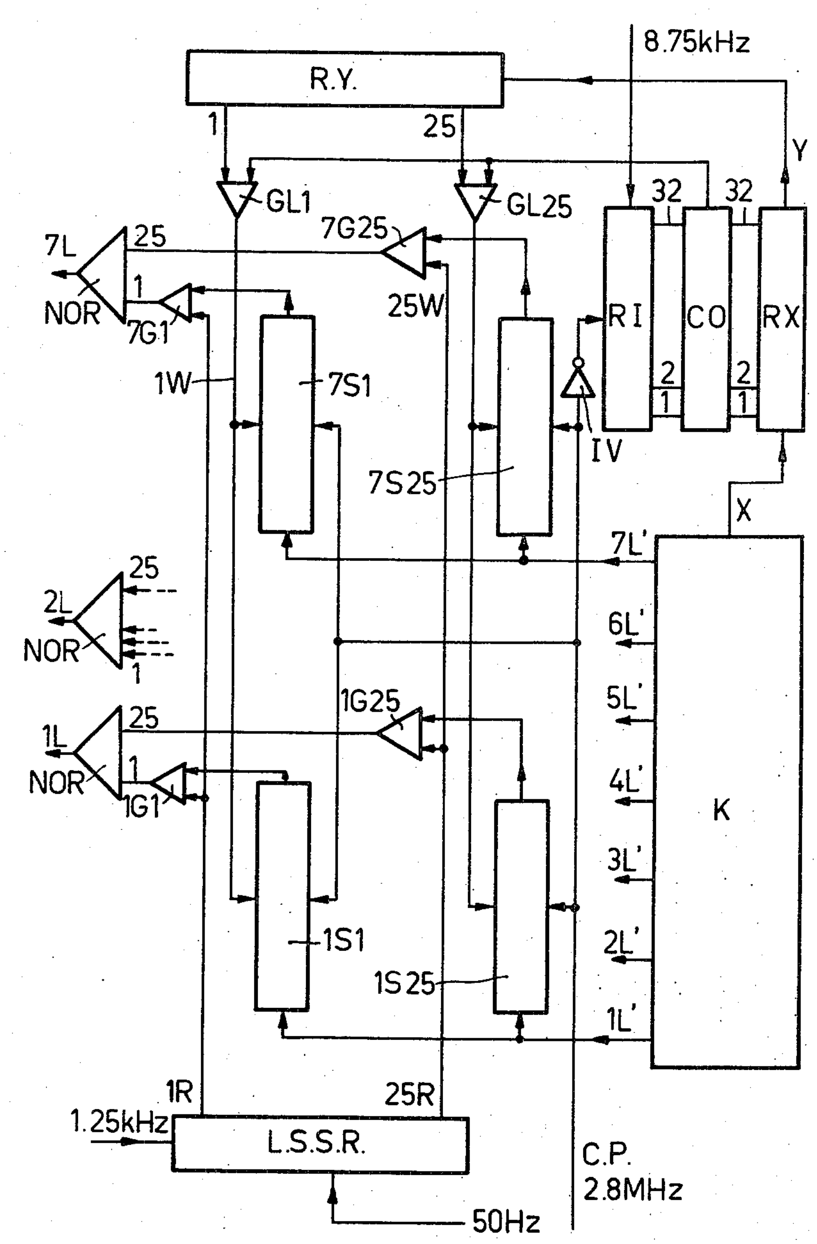
FIG. 3 is a block schematic diagram of the recirculating store of the arrangement of FIG. 2.

The block schematic diagram of FIG. 3 shows the recirculating store RS in more detail. The recirculating store comprises 25 groups of seven shift registers 1S1 . . . . 7S1 to 1S25 . . . . 7S25, each of which is a 32-bit recirculating shift register. Each of these 25 groups of shift registers is used for storing input data in respect of a different one of the 25 possible character lines of the panel display: corresponding bit positions of the seven registers in each group are used for storing input data as a 7-bit word in respect of each of the 32 possible characters per line. These recirculating shift registers are all driven in parallel by the 2.8 MHz CLOCK PULSES, and their outputs from their 32nd bit positions are fed to individual gates of 25 groups of gates 1G1 . . . . 7G1 to 1G25 . . . . 7G25. These 25 groups of gates are opened in turn recurrently by a line scanning shift register LSSR which is driven by 1.25 KHz LINE PULSES to produce successive outputs on READ ENABLE lines 1R to 25R. The outputs of corresponding gates of the 25 groups are applied in common to respective NOR gates NG1 to NG7 the outputs of which, on 7 leads 1L to 7L, constitute 7-bit words which identify characters for display and which are applied to the character generator for selecting the appropriate characters, as will be described. The time positions occupied by successive 7-bit word outputs on the leads 1L to 7L in the operating cycle of the electrical display device define the positions on the panel display of the characters to which these 7-bit word outputs pertain. The shift register LSSR is driven at only one-seventh the row scanning rate of the panel display because, as aforesaid, 7 rows of cells are required to build-up a character. The shift register LSSR is reset each 20 mS field period by 50 HZ RESET PULSES.

An alpha-numeric keyboard K is used for supplying 7-bit word input data in respect of characters to be displayed. A 7-bit word for insertion into the recirculating stores is applied thereto over leads 1L' to 7L' from the keyboard K, corresponding recirculating stores in each of the 25 groups being connected in common to individual ones of the leads 1L' to 7L'. The keyboard K also produces X-pulses for determining which corresponding bit positions, of the 32 possible positions, a 7-bit word input data is to occupy. These X-pulses drive a 32-bit X-position register RX which produces a Y-pulse once per cycle of its drive. The Y-pulses drive a Y-position register RY. In dependence on the number of X-pulses produced by the keyboard K, the X-position register RX assumes a final position which identifies the bit position of a group of recirculating stores that the input data from the keyboard K is to occupy, and the Y-position register RY assumes a final position which identifies the particular group of recirculating stores. An output from register RX at the final position is applied to a comparator CO. Outputs from each bit position of a 32-bit position identification register RI are also applied in turn to the comparator CO. When there is coincidence in the comparator CO of the output from the register RX and an output from the register RI, the comparator CO produces an output which is applied in common to a group of 25 gates GL1 to GL25. A particular one of these gates GL1 to GL25 is already primed by an output from the register RY at its final position, so that this gate opens to produce an output on one of 25 WRITE ENABLE lines 1W to 25W. This output causes the input data to be written into the group of recirculating registers concerned at the corresponding bit positions as identified by the register RX.

The register RS is driven by the 2.8 MHz CLOCK PULSES through an inverter IV. The inverted and non-inverted CLOCK PULSES are illustrated by waveforms (a) and (b) respectively in FIG. 4. When new input data is to be written into the recirculating registers, the appropriate bit in each recirculating register concerned is updated one clock pulse after the old data is read out, the new data being read out 31 clock pulses later. The clock pulses applied to the identification register RS are inverted so that no ambiguity occurs between reading-out and writing-in data. For example, if old data is read-out on clock pulse 1, say, and new data is written in on clock pulse 2, then the new data is available at the next clock pulse 1 and can be read out half a clock pulse later. This is illustrated by waveforms (c), (d), (e) and (f) in FIG. 4. Waveform (c) represents the 2nd bit position of the register RS and waveform (d) the 1st bit position. Waveform (e) represents new data written into the 1st bit position from a WRITE ENABLE line and waveform (f) represents the new data output on a READ ENABLE line 31 clock pulses later. It is assumed that all registers are clocked on the positive edge of the clock pulses. The register RS is reset each row period by the 8.75 KHz ROW PULSES.

Figure 6:
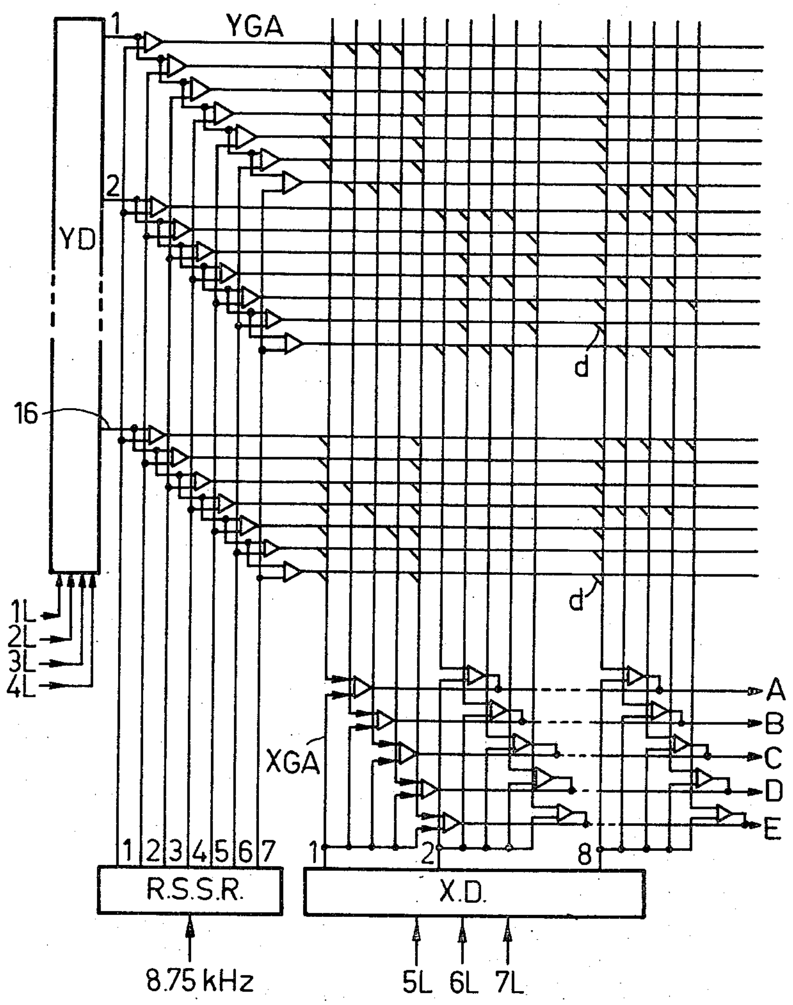
FIG. 6 is a fragmentary block schematic diagram of the character generator of the arrangement of FIG. 2.

FIG. 6 shows a schematic diagram of the character generator (CG- FIG. 2) to which the 7-bit words which identify the characters for display are applied over leads 1L to 7L. The 7-bit code enables up to 128 characters and symbols to be used, and the coding suitably corresponds to the standard USASC II code. The character generator is a diode matrix arranged in a 16 × 8 format. The 7-bit words applied over the leads 1L to 7L are split into a 4-bit and a 3-bit word which define respectively Y and X co-ordinates of the 16 × 8 format. Each location of this format is in the form of a 7 × 5 matrix of diodes, so that the complete diode matrix comprises 16 × 7 Y-lines and 8 × 5 X-lines of diodes. Leads 1L to 4L are connected to a 4-bit/decoder YD which is responsive to the 4-bit code on these leads to select the required group of 7 Y-lines from the 16 possible groups. A row scanning shift register RSSR which is driven by the 8.75 KHz ROW PULSES makes a selection of the appropriate row out of 7 through groups of gating amplifiers YGA. Leads 5L to 7L are connected to a 3-bit X-decoder XD which is responsive to the 3-bit code on these leads to select the required group of 5 X-lines from the 8 possible groups. Corresponding X-lines in the 8 groups are commoned to output leads A to E through groups of gating amplifiers XGA. Each intersection of the X-lines and Y-lines of the matrix that requires a connection is bridged by a diode *d* which, in effect, forms a character element, the characters being build-up by selective positioning of the bridging diodes *d* at appropriate intersections as can be seen in FIG. 6. Each of the X-lines is connected to a different one of the gating amplifiers XGA each of which is operable to apply an output to the relevant one of the output leads A to E in response to an output applied to it from the X-decoder XD and an output from the relevant X-line, the latter output being applied from a particular one of the 16 outputs from the Y-decoder YD, through one of the 7 gating amplifiers YGA associated with that output (as determined by the register RSSR) and through the relevant bridging diode *d*.

Figure 4:
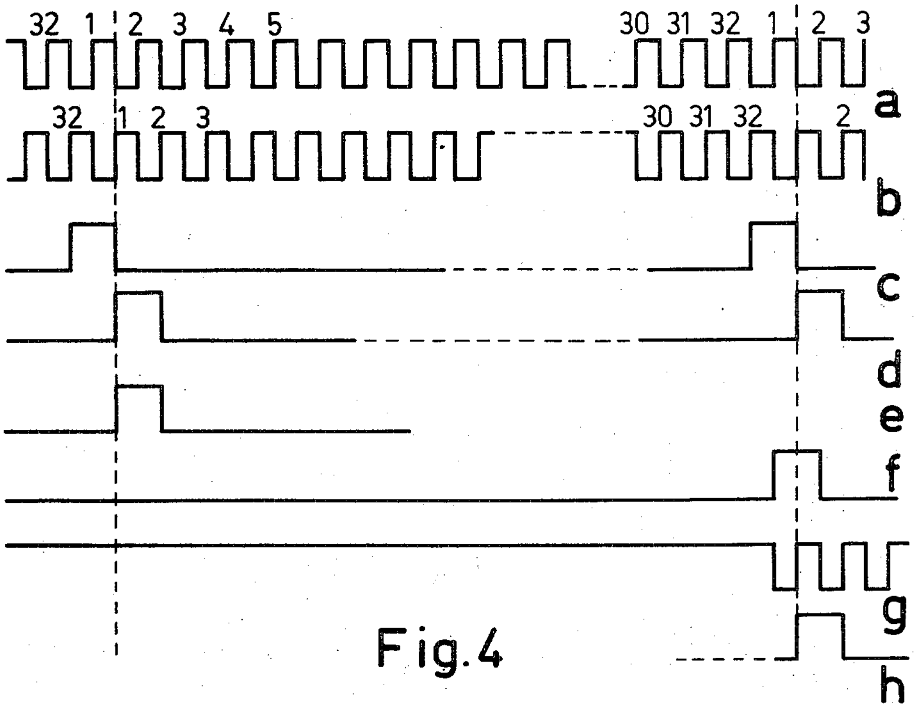
FIG. 4 shows the time relationship between the pulses used in the arrangement of FIG. 2.
Figure 5:
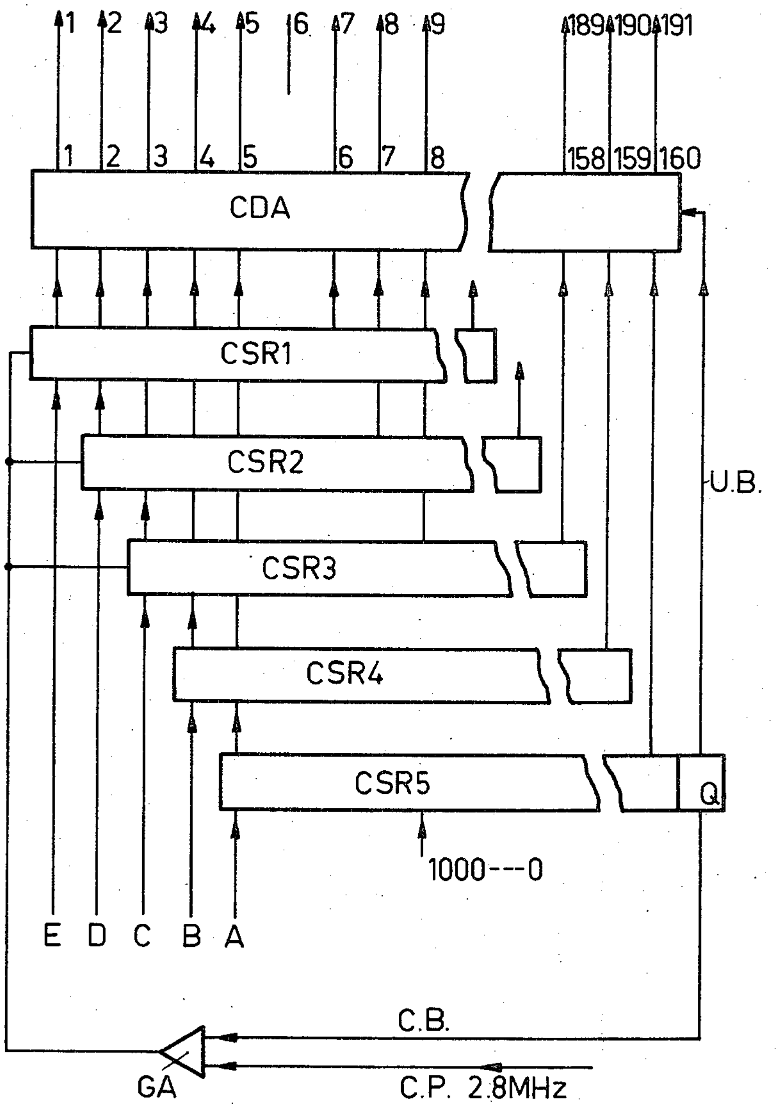
FIG. 5 is a block schematic diagram of the column shift registers of the arrangement of FIG. 2.

FIG. 5 shows the column shift registers (CSR - FIG. 2) in more detail. These column shift registers comprises five 32-bit discrete registers CSR1 to CSR5 having the data leads E to A from the character generator (CG) connected respectively to their inputs. Data for one character row (i.e. in respect of the cells which are to be illuminated for a character in one row) is clocked into the registers CSR1 to CSR5 in parallel at the rate of 1 character per clock pulse. As aforesaid, that takes 12 $\mu$S for one row of 32 characters and is repeated 7 times per line of characters, the cells of the display panel being addressed by the registers CSR1 to CSR5 through the cathode drivers CDA for 100 $\mu$S per row during which time the clock pulses are blanked. The extra bit-position Q of register CSR5 produces a clock blanking signal, when the registers are full for inhibiting the gating amplifier GA. An unblanking pulse for enabling the cathode drivers CDA is also produced simultaneously from this extra bit position. Waveform (g) in FIG. 4 shows the column addressing period during which the clock pulses are blanked and waveform (h) shows the first bit positions of the column shift registers.

By using discrete column shift registers in parallel in this way a clock pulse rate can be used which is only one fifth of the clock pulse rate which would be required for a single column register which is filled serially with data from the character generator.

It is mentioned in connection with the "line-dumping mode" of operation referred to herein that the line-dumping may be sequential in that successive rows of a matrix are addressed in turn with row pulses, or the line-dumping may be performed in a pseudorandom fashion, in which the rows are addressed in turn in a predetermined recurrent pattern.

What is claimed is:

1. An electrical display device comprising a plurality of alphanumeric character spaces in rows and columns, each alphanumeric character space comprising an array of intermittently energized light emitting elements, said device comprising a character generator for generating a parallel data code from an input alphanumeric character code, a column energizer comprising a plurality of shift registers corresponding to the number of columns of elements within said alphanumeric character space, means for coupling said parallel data code to said plurality of shift registers whereby each of said shift registers receives a separate data bit, and means to couple said shift registers to said elements whereby selected elements become energized in correspondence to data bits stored in said shift registers, means for generating a signal for scanning elements in a row, said scanning signal generating means providing for scanning said rows recurrently at a field rate of at least approximately 50 HZ so as to prevent flickering of said light emitting elements, and means for sequentially coupling said scanning signal generating means to said elements, said elements becoming active when a row scanning signal is contemporaneously received by an energized element.

2. An electrical display device as claimed in claim 1 wherein said array of light emitting elements further comprises inactive elements for providing spacing between said alphanumeric characters.

3. An electrical display device as claimed in claim 2, wherein said alphanumeric character space comprises seven rows of active elements arranged in five columns.

4. An electrical display device as claimed in claim 1, further comprising recirculating storage means coupled to said character generator.

5. An electrical display device as claimed in claim 1 further comprising a scanning register coupled to said character generator and operating in synchronism with said means for generating a signal or scanning elements in a row.

6. An electrical display device as claimed in claim 1 wherein said character generator is a diode matrix.

7. An electrical display device as claimed in claim 1 wherein said light emitting elements comprise light emitting diodes.

8. An electrical display device as claimed in claim 1 wherein said light emitting elements comprise glow discharge tubes.

* * * * *

PO-1050
(5/69)

UNITED STATES PATENT OFFICE
CERTIFICATE OF CORRECTION

Patent No. 3,793,629 Dated February 19, 1974

Inventor(s) Graham Trevor Sharpless

It is certified that error appears in the above-identified patent and that said Letters Patent are hereby corrected as shown below:

IN THE TITLE PAGE
INSERT WHERE APPROPRIATE

--[30] Foreign Application Priority Data

October 30, 1969 Great Britain.....53300--

Signed and sealed this 24th day of September 1974.

(SEAL)
Attest:

McCOY M. GIBSON JR.
Attesting Officer

C. MARSHALL DANN
Commissioner of Patents